July 21, 1964  H. A. FOX ETAL  3,141,811
FIBROUS LAMINATE AND METHOD OF PRODUCING THE SAME
Filed April 1, 1958  2 Sheets-Sheet 1
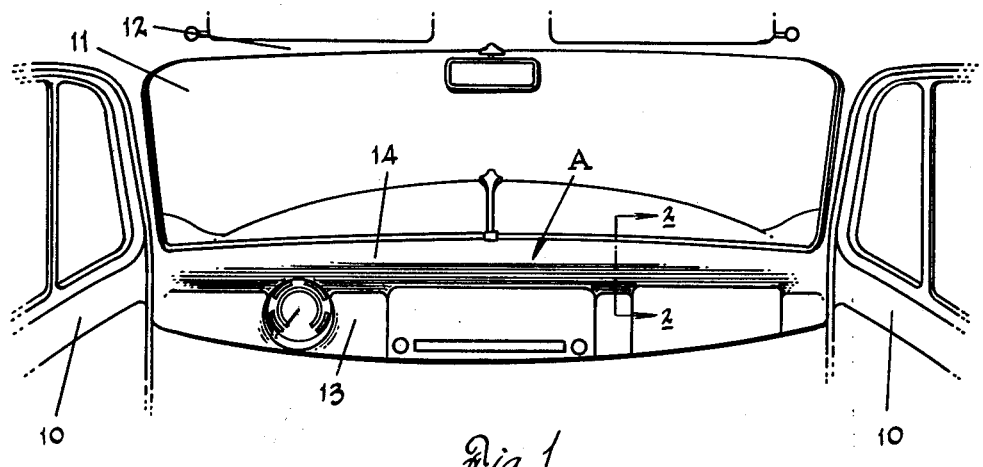
Fig. 1
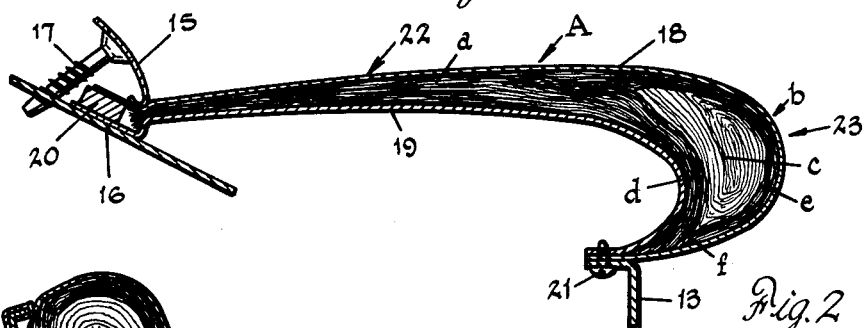
Fig. 2
Fig. 4
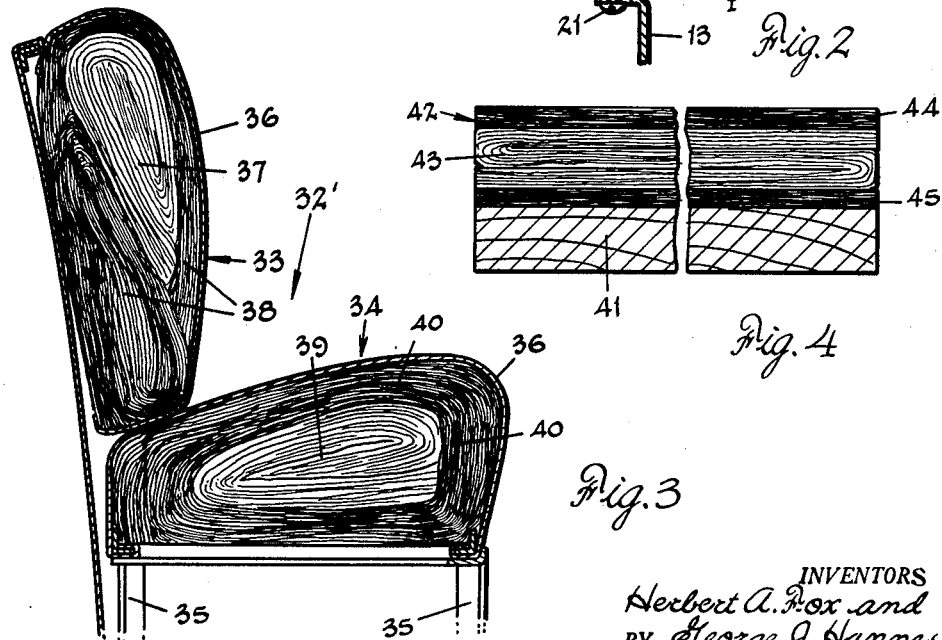
Fig. 3
INVENTORS
Herbert A. Fox and
BY George J. Hannes
Nobbe & Swope
ATTORNEYS July 21, 1964  H. A. FOX ETAL  3,141,811
FIBROUS LAMINATE AND METHOD OF PRODUCING THE SAME
Filed April 1, 1958  2 Sheets-Sheet 2

INVENTORS
Herbert A. Fox and
BY George J. Hannes
Nobbe & Swope
ATTORNEYS

United States Patent Office 3,141,811
Patented July 21, 1964

3,141,811
FIBROUS LAMINATE AND METHOD OF
PRODUCING THE SAME
Herbert A. Fox, Perrysburg, and George J. Hannes, Maumee, Ohio, assignors, by mesne assignments, to Johns-Manville Fiber Glass Inc., Cleveland, Ohio, a corporation of Delaware
Filed Apr. 1, 1958, Ser. No. 725,714
14 Claims. (Cl. 161—93)

The present invention relates broadly to fibrous structural and cushioning units, and is more particularly concerned with a resilient body of siliceous fibers having new and improved structural characteristics.

This application is a continuation-in-part of our co-pending application Serial No. 387,982, filed October 23, 1953, now abandoned.

It is an important object of the present invention to provide a structural unit which is adapted to withstand repeated deflections without substantial deterioration.

Another object of the invention is to provide a laminated glass fiber structural unit having adjacent laminates of differing density, with the laminate of higher density serving primarily as a substantially rigid support for the laminate of lower density.

Another object of the invention is to provide a cushioning material having areas throughout its mass which differ as to density, as well as resistance to deformation, from other areas of the mass of material.

Another object of the invention lies in the provision of a padding substance which is characterized by relatively high energy absorbing properties and relatively low rebound as compared with materials and constructions heretofore known or used.

A further object of the invention is to provide a cushioning material formed of at least two layers of fibrous glass, one of said layers being of relatively greater density and compressibility than the other of said layers, both of said layers being bonded together into a substantially unitary whole.

A further object of the invention lies in the provision of a method of producing cushioning materials having the characteristics set forth in each of the foregoing objects.

A still further object of the invention is to provide a cushioning substance adapted for use as automotive crash pads, human head protectors, set cushions, and the like.

Other objects and advantages of the invention will become more apparent during the course of the following description when taken in connection with the accompanying drawings.

In the accompanying drawings wherein like numerals are employed to designate like parts throughout the same:

FIG. 1 is an elevational view of an automobile interior, showing a crash pad in position upon the shelf portion of the dash panel;

FIG. 2 is a vertical sectional view taken substantially along the line 2—2 of FIG. 1;

FIG. 3 is a cross-sectional view of an illustrative seat embodying the invention;

FIG. 4 is a cross-sectional view of a boxing ring platform embodying the present invention;

Figure 5:
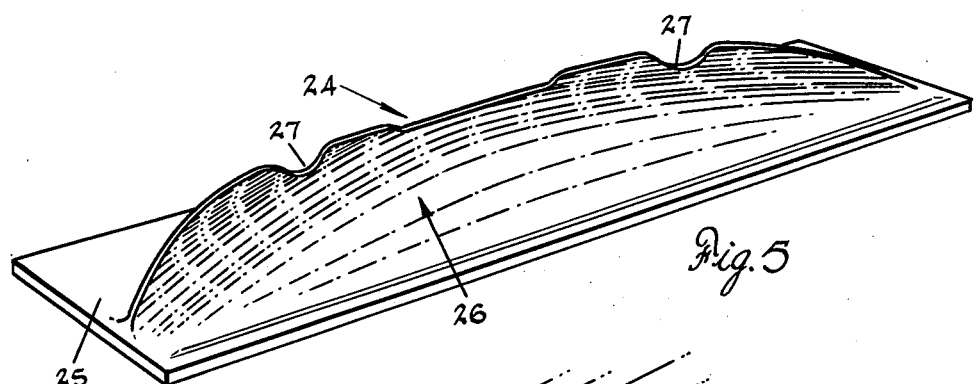
FIG. 5 is a perspective view of one of the molding members which may be employed in producing crash pads in accordance with a preferred method of this invention.

In recent years, particularly with the advent of automotive vehicles and aircraft travelling at increased speeds, considerable emphasis has been placed upon the protection of the operator and occupants against impact with the structural parts of the vehicle in the event of a sudden stop or actual collision. Illustrative of devices which have been proposed, and in some cases actually used, are various types of body harnesses, head helmets, and the like. Means of this character have been generally confined to aircraft. Recently, however, automotive manufacturers have been devoting ever increasing time and effort to the development of structures which will guard against serious injury to the car driver and occupants should they be jolted forwardly by a sudden stop or collision of the vehicle.

Since many of the injuries occurring in road vehicles have been caused by bodily contact with the dash panel of the car or truck, it is only logical that this portion of the vehicular interior receive considerable attention. Efforts have therefore been made in the relatively recent past to cushion the dash panel and particularly the shelf portion thereof with an adequately resilient material to absorb the bodily impact. One substance in which some interest has been manifested has been sponge rubber; however, actual experience therewith has demonstrated at least one serious inherent deficiency in this particular material. This is its "rebound" characteristic.

To explain, one prime advantage of a crash pad in a vehicle is its ability to absorb to a very considerable degree the energy created when a human body is thrust forwardly as a result of an accident. For this purpose the pad must have a high energy absorbing property or characteristic so the force possessed by the body as it is pitched forwardly will be taken up by the pad, and not by the vehicle structure. At the same time, however, the pad must be characterized by minimum rebound; that is, it should not possess the ability to repel the human body rearwardly and into a position to be thrust forward again. Sponge rubber, having inherent springiness of rubber, has thus not proven successful for crash pad and other protective device used because of its high rebound characteristics.

Such a disadvantage has been substantially entirely overcome, and additional advantages accomplished, by the present invention. Briefly, the structure hereindisclosed comprises a plurality of layers of individual glass fiber mats laminated to one another, one of said layers being formed of a glass fiber mat having initially unactivated binder contained therein, preferably thermosetting resin, and another being formed of a glass fiber mat, the fibers of which are bonded together by an activated binder, preferably a cured thermosetting resin, the layers being laminated into a composite body. If desired, the initially uncured mat may have a lower density and a mat of sufficient thickness may be used and sufficient pressure applied during laminating to result in a higher cured density. Preferably, however, the initially uncured mat or layer is of relatively greater density than the precured fibrous glass mat and the pressure applied during laminating compresses the layer to an even greater density. Thus, after lamination to the precured layer, the initially uncured layer has materially greater resistance to deformation than the precured material. By such an arrangement the final structure has high energy absorbing properties, and, being predetermined as to resiliency and compressibility, has a relatively low rebound characteristic. Construction can be tailored by this means to provide a very wide range of compressibility by varying the individual layers so assembled.

The method of this invention, that of bonding, under heat and pressure, an uncured resin impregnated glass fiber mat to a previously cured resin impregnated glass fiber mat to achieve a unitary glass fiber laminate having bonded layers of different densities, presents decided advantages over previously known methods for forming glass fiber laminate structures. Thus, the use of previously known methods in some instances resulted in unsuccessful laminations or in inferior laminates, while in other instances the production of such glass fiber laminate structures in accordance with known methods resulted in excessive production costs.

The method of this invention has been proven to be especially valuable in the formation of glass fiber laminated structures which are resilient and possess the desired degree of structural strength as well as a firm bond throughout. The initially uncured layers of the glass fiber laminated structures produced in accordance with the method of this invention give 'body" or "form" to the laminated structure on being cured such that the laminate will not lose its shape, and the dense skin or surface layer additionally provides a rigid foundation to which decorative layers may be secured. The uncured facing layer, when compressed and laminated to the low density cured core material, actually has a certain amount of resin and fiber flow into the interface of the core, probably as a result of the resistance of the core, which results in the fibers of the uncured layer being projected into the voids between the fibers of the cured layer, thus providing an intermingling of the glass fibers of the respective layers at the interface at the same time as the thermosetting resin contained in the uncured layer is being cured. Thus, the same degree of adhesion is secured throughout the mat resulting in a superior bonding and, for all practical purposes, a single unitary structure. The actual bond between the two layers is, for all intents and purposes, substantially identical to the bond provided throughout the individual layers and does not materially change the predetermined density characteristics desired.

Substantial savings in the amount of resin necessary for forming a satisfactory unitary laminate are achieved by forming the fibrous glass laminate structures in accordance with the method of this invention. Thus, the completed laminate structures require considerably less resin than similar structures which heretofore have been formed of two precured resin impregnated glass fibrous layers bonded together by means of a layer of adhesive at their interface. In many instances the amount of resin required in the laminate is on the order of 50% less than where two precured layers are used. Also, where two precured layers were thus used to form comparable laminated structures, the individual layers acted as insulating media and, depending upon their relative thickness and density, made it difficult to cure the bonding layer of adhesive. Where a catalyst was added to the adhesive in order to obtain a lower curing temperature, thus overcoming this difficulty to some extent, the cost of the resin-catalyst mixtures made their use in the production of such laminate structures prohibitive.

The method of this invention additionally results in savings of other production costs in the formation of fibrous glass laminates having varying densities over comparable methods where two precured layers of resin impregnated glass fibrous mats are bonded by means of an adhesive layer therebetween. Thus, where compound curves are involved in the finished laminate structure, particularly in such items as crash pads and molded refrigerator doors, and where two or more precured layers are used to form the laminate structure, the mating surfaces of the two or more precured layers must be formed within carefully controlled tolerances in order that a firm bond between the two layers may be achieved when an adhesive layer is applied at their interface and cured. Such indexing costs result in substantial additional costs in production compared with costs incurred in accordance with the method of this invention.

A low density fibrous core material having a continuous high density surface completely enclosing its exterior periphery could not be formed using two precured layers, and the novel articles of the invention such as the crash pad shown in FIG. 2 and the illustrative seat embodying the invention, shown in FIG. 3, could only be produced successfully in accordance with the method of this invention. In order to form such items enumerated above, using two or more precured layers, additional operations would have to be used in order to complete the laminate structure and, again, problems of matching the mating surfaces where compound curves would be involved would make the costs excessive. Such laminates, of course, would not have a continuous surface but would be comprised of various areas of adhesive joining the cured shaped resin impregnated glass fiber sections.

By using the method of this invention, persons skilled in the art are also enabled to control the cushioning properties of the completed laminate structure much more effectively than with laminates formed of two precured layers having an adhesive layer therebetween. Cushioning properties of laminates formed in accordance with our invention are directly dependent upon the cushioning properties of the individual layers which form the laminate as contrasted with the cushioning properties of a laminate formed from two precured layers in which the properties of the adhesive layer bonding the two precured layers provides a third factor by which the cushioning properties of the over-all structure are limited.

Where two uncured layers are used to form a laminated structure in one operation under the action of heat and pressure the density of the uncured mats on curing is determined by the core stock used and, where the core stock used is substantially identical in composition to the second glass fiber mat material, the density of the two layers will have, for all practical purposes, an identical density in the cured laminated structure. Even in using varying compositions in the individual layers to provide varying densities when forming a laminate structure from two uncured layers, the possible differences in the densities of the two layers would be severely limited and it would be impossible to achieve laminates having the characteristics of those produced in accordance with the method of this invention.

A composite fibrous structural unit constructed in accordance with the method of this invention as above-described is illustrated in the drawings, and more particularly, in FIGS. 1 and 2 thereof. Since such a novel construction has been found particularly desirable as an automotive crash pad, it will be first described in that connection. It will be appreciated, however, that innumerable uses exist for the product of the invention, including arm rests, preformed seats, sporting event platforms, molded insulation parts, and other similar articles. Detailed reference will subsequently be made to certain of said named products, by way of further illustration.

In FIG. 1 is diagrammatically shown the interior of a conventional automobile provided with doors 10, a windshield 11, hood portion 12, and dash panel 13. Upwardly of the dash panel and extending horizonatlly rearwardly from the windshield is a shelf portion or area 14 upon which the crash pad A of the present invention is suitably positioned.

Means for securing the crash pad to the vehicular body structure may take one of several different forms, FIG. 2 illustrating one suitable mounting construction. As shown therein, the forward end of the crash pad may be clamped between the windshield molding strip 15 and the firewall 16, the tension on said strip and consequent clamping action on the pad being controlled to a degree by screws or the like 17 passing through the molding strip 15 and firewall 16. As will be noted later, decorative fabric layers 18 and 19 are provided on the upper and lower surfaces respectively of the crash pad A, and said layers may be employed to secure the forward end of the pad between the molding strip and firewall. When thus attached to the vehicle, the fabric layers of the pad may be separated at the forward end thereof by a spacer 20 to obtain an adequate clamping action thereon. As also shown in FIG. 2, the opposite end of the crash pad A may be attachedh to the dash panel 13 by screws or the like 21 suitably spaced along the length of said panel.

The crash pad itself is formed, as above noted, of a plurality of layers of individual glass fiber mats, one of said layers comprising initially uncured material and another of said layers forming a base or core being formed of initially precured fibrous material, the layers being laminated into a relatively rigid body. A crash pad of this construction is shown in cross-section in FIG. 2, and upon reference thereto it may be seen that the pad A is shaped to conform generally to the contours of the shelf portion 14 of the dash and extends substantially throughout the entire length thereof. The pad may of course assume various shapes depending on the construction of the dash; however, it will generally comprise a horizontal area 22 which is located upon the correspondingly horizontal section of the dash shelf portion 14, and a generally vertical area 23 extending downwardly from the horizontal area 22 in contacting relation with the rearward section of the dash shelf portion.

The horizontal area 22 of the crash pad is preferably formed of initially uncured layers of fibrous glass laid one upon the other to provide a padded section $a$ of initially uncured material having a relatively high density and relatively high resistance to deformation. As finally produced, the padded section $a$ is of considerable rigidity and much less compressible than any other portion of the pad A.

The vertical cushioning section $b$ of the pad A is, as shown, of generally elliptical shape and constitutes the contact area of the pad which receives the impact of a human body thrown thereagainst. To prevent, or at least reduce, serious bodily injuries the vertical section is so constructed as to have maximum energy absorbing properties with minimum rebound. This is herein accomplished by the use of glass fibers and a novel combination of said fibers, a portion of which are initially uncured and another portion precured. Referring again to FIG. 2, the vertical section $b$ of the pad A is seen to comprise a precured fibrous glass base or core section $c$ positioned between layers $d$ and $e$ of initially uncured material, said layers $d$ and $e$ merging at one end of the precured section $c$ into the padded section $a$ earlier referred to, and at the opposite end of said precured section into an initially uncured section $f$ adjacent the dash panel 13 and secured thereto.

The initially uncured sections $a$, $d$, $e$ and $f$ as finally utilized in the crash pad A are of relatively greater density and rigidity than the precured section $c$ and thus function very adequately to the maintenance of the molded shape imparted to the pad. That is to say, being capable of molding into any shape, and upon completion of curing being a substantially rigid and high density material, the initially uncured sections give "body" or "form" to the pad A such that it will not lose its shape and provide a rigid foundation to which decorative fabric layers 18 and 19 may be secured.

Further, in addition to the desirable rigidity characteristic, the present pad has sufficient compressibility so as to absorb adequately the energy created by a human body moving over the distance from the vehicular front seat to the dash panel. At the same time, however, being formed of fibrous glass and constructed of said material in a novel manner, the pad A has relatively low rebound as compared with sponge rubber and other such materials proposed for or experimented with in crash pads.

To explain, fibrous glass inherently does not have the same rebound characteristic as sponge rubber, but has in fact, a substantially lower rebound. Thus, while glass fibers are of considerable resiliency and compressibility, the time lag in springing back after deflection or compression is greater than with rubber or rubber-like materials. In addition to the inherent nature of glass fibers, minimum rebound by the present invention results from the manner in which fibrous glass mats of different characteristics are herein combined. Viewing again FIG. 2, and particularly the vertical section $b$ of the pad A shown therein, the precured section $c$ is formed of a fiber glass mat folded upon itself a predetermined number of times and is of relatively lower density and has lesser resistance to deformation than the initially uncured sections $d$ and $e$ surrounding said precured section $b$. Therefore, when utilizing a predetermined number of layers of precured and initially uncured fibrous glass arranged in a controlled manner, the desired degree of compressibility and energy absorption may be obtained.

As a result, and when, by way of example, the construction embodying the features of FIG. 2 is employed, the initially uncured sections $d$ and $e$, being backed by the precured section $c$, will resist compression after impact to a relatively low degree, and when said impact is of sufficient magnitude, the precured section $c$ will compress a predetermined amount and absorb substantially all of the energy possessed by the body striking it. However, if the body possesses a small amount of energy which was not absorbed by the precured section $c$, this remaining energy will be taken up by the initially uncured section $d$ adjacent the shelf portion 14 of the dash. Normally, though, the section $d$ will constitute an extra safety factor since by experimental procedures the compressibility of the precured section $c$ may be predetermined and adjusted so as to absorb the maximum amount of energy anticipated with a margin of safety remaining.

After compression of the pad A by impact, and absorption of substantially the entire energy directed thereagainst, the precured section $c$ will tend to dissipate or release the energy possessed thereby. This release or rebound, however, will be at a minimum by virtue of the use of glass fibers, and additionally, will be restricted or diminished by the resistance to rebound provided by the relatively rigid, initially uncured section $e$. Thereby, any tendency of the precured section $c$ to spring forwardly will in a large measure be deterred and the rebound held to a minimum.

Figure 6:
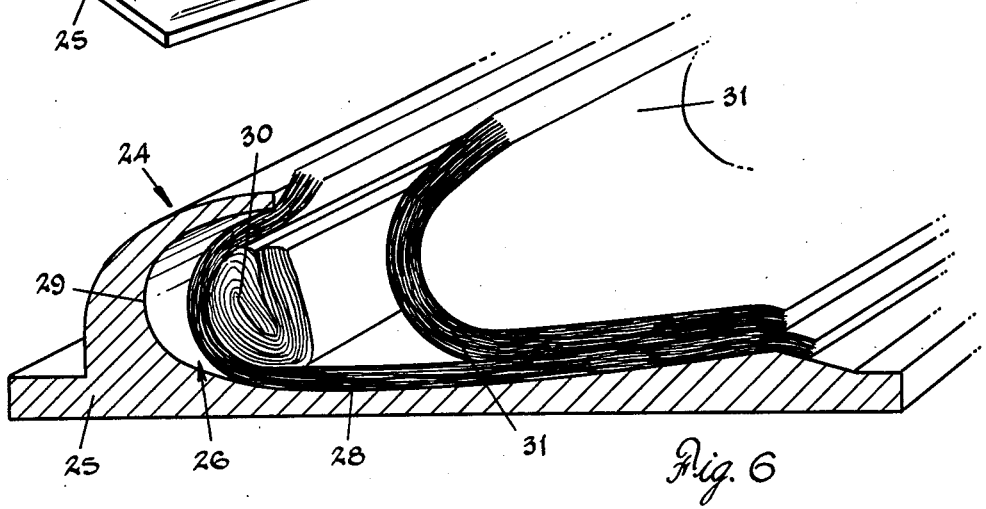
FIG. 6 is an enlarged fragmentary section of the mold of FIG. 5 showing the components of the present crash pad being positioned therein.
Figure 7:
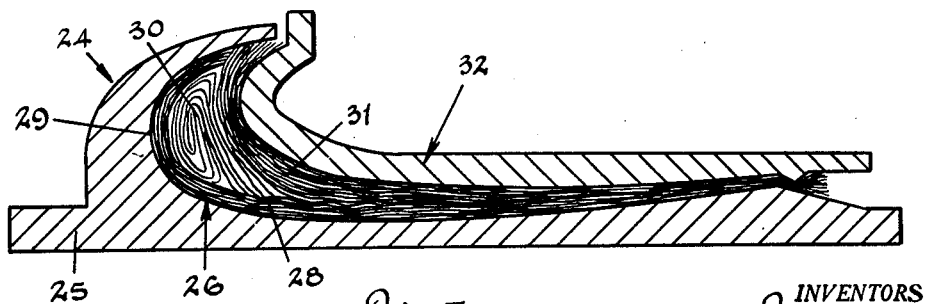
FIG. 7 is an enlarged fragmentary section illustrating an upper molding member being located in pressing engagement with the assembly of FIG. 6.

Molding apparatus suitable in the process of fabricating crash pads of the character described is illustrated in FIGS. 5, 6 and 7, and, upon reference thereto, it may be seen that there is preferably provided a female molding member 24 comprising a base plate 25 from which is erected a shaping surface 26 conforming to curvature and contour to be produced. The shaping surface may be formed of a suitable sheet metal, such as stainless steel, and is provided along its upper marginal edge with cut-out portions 27 to accommodate the speedometer, clock or other instruments on the dash panel 13.

In producing the present crash pads, a preferred method is to locate a predetermined number of layers of initially uncured fiber glass material 28 onto the shaping surface 26 and to press said layers into contact with all portions of said surface, particularly the generally elliptical area 29 which will subsequently produce the vertical cushioning section $b$ of the pad A. Thereafter, one or more layers of precured fibrous glass 30 suitably folded upon itself is laid into the elliptical mold area 29 and in pressing engagement with the initially uncured material 28. A predetermined number of layers of initially uncured glass fibers 31 are then located in the elliptical area 29 of the mold so as to contact the precured layer 30 and completely surround the same. That is to say, the layers 31 are positioned with reference to the layers 28 to provide in the final crash pad A the initially uncured section $a$ constituting the horizontal area 22 of said pad, the initially uncured sections $d$ and $e$ on opposite sides of the precured section $c$, and the initially uncured section $f$ which is formed by the merger of said sections $d$ and $e$.

Subsequent to the accurate positioning of the respective fibrous glass layers in and upon the shaping surface 26, a male molding member 32 is pressed against the assembled layers. Suitable clamping means (not shown) may be positioned at spaced intervals along the edges of the molding members 24 and 32 to assure satisfactory engagement of parts, and the clamped assembly advanced into a curing oven. By way of example only, it has been found that the fibrous glass layers 28, 30 and 31 may be properly laminated together at an oven temperature of 325° F. for thirty minutes. The number of layers utilized, the binder on the fibers, and many other conditions will of course at times render a different curing cycle more suitable.

The fibrous glass material employed in the present invention is that designated in the art as "super-fine," which is produced by flame attenuation and has an average fiber diameter generally not more than five microns. In accordance with one process, such as described in Slayter and Fletcher Patent No. 2,489,242, the molten glass streams are attenuated by a high temperature, high pressure gaseous blast into very fine fibers, and substantially simultaneously therewith, are coated with a thermosetting binder and collected in mat form upon a moving surface. The mat is then caused to pass through a curing oven wherein the binder, which may be phenol formaldehyde, is substantially completely polymerized or cured and the fibrous glass body compressed into a resilient bonded structure. These structures may be made to vary in density and thickness to a considerable degree.

The initially uncured sections a, d, e and f may be formed of mats of super-fine glass fibers wherein the binder or adhesive has not been polymerized or cured prior to the crash pad molding operation shown in FIGS. 5, 6 and 7. Such an initially uncured material is obtained by removing the fibrous mat from the production line prior to its passage through the curing oven, or by shutting off the curing oven and removing the uncured mat from the exit end of the machine. By this procedure the binder is in substantially the stage as when originally applied, that is, it might be said to be between the "A" and "B" stage, and, as carried on the glass fibers, results in a rather sticky fibrous body. While in this condition the fibrous mat has considerable adhesive characteristics, and as employed in the present crash pad, performs the additional function of laminating the various layers of fibers into a composite body.

By way of example, the previously cured section c in the crash pad A may have a density of about ½ to 3 pounds per cubic foot, preferably ¾ pound per cubic foot. The initially uncured sections, a, d, e, and f, may have a much wider density range of between about 3 to 30 pounds per cubic foot depending upon the desired density of the crash pad. For example, the section e may have a relatively low density of about 3 pounds whereas the sections a, d and f as well as the portions on both the upper and lower surface of the pad adjacent the members 15 and 16 would have densities running as high as 30 pounds. This difference is accounted for by the fact that greater structural strength is required adjacent the points of support whereas this strength is not required and in fact detracts from the usefulness of the crash pad in the area bounded by the section e which would receive the impact of a human body in the event of an accident. If it is desired that the base section c have a density of 3 pounds per cubic foot the corresponding density for the section e would run about 18 pounds whereas with a base or core density of ½ pound per cubic foot the density of the section e would run about 6 pounds per cubic foot. Thus, it will be seen that the density ratio of core to skin layer is a minimum of about 1 to 6, in the case of the sections c and e, and between about 1 to 10 and 1 to 60 in the case of the sections c and f.

Although superfine glass fibers are preferred in the present invention, it will be appreciated that fiber of larger diameters may also be used alone, or in combination, with superfine fibers. It is also contemplated that other siliceous fibers, such as mineral wool or rock wool, which have similar physical properties to glass fibers, may be used to replace some or all of the glass fibers.

Although thermosetting resins of the phenol formaldehyde type are referred to herein as being the preferred binders used in forming the laminate structures of this invention it is contemplated that other types of thermosetting resins such as melamine and urea formaldehyde may be used. Thermosetting resins are used in forming the unitary laminates of this invention as they possess the desired physical properties, i.e., they are inert and resistant to chemical action on curing and will not deteriorate in the presence of heat or light. Laminate structures formed from phenol formaldehyde impregnated fibrous glass mats according to the invention may contain a resin content in the range of about 5% to 35% as measured by ignition loss evenly distributed throughout the cured laminated structure. Satisfactory structures have been made wherein the resin content of both the initially cured and initially uncured fibrous layers was about 15%.

For various predetermined compressibility conditions, a variable number of layers of initially cured and precured resin coated fibrous mats may be used, the essential requirement being the combination of the two types of materials to attain variations as to compressibility or resiliency of the final pad. As for example, in the pad at FIG. 2, five layers of initially uncured material are used with one layer of precured material. Considerable departures may be made for this arrangement.

Although the combination of precured fibrous glass mats with initially uncured glass fiber mats to obtain maximum energy absorption and minimum rebound characteristics in the finished laminate, and additionally to obtain a superior laminate structure strongly bonded into a unitary whole, is presently of extremely important application in crash pad work, a multitude of other uses exist for the disclosed method of lamination and the resultant laminate structures. As for example, in FIG. 3 there is illustrated a chair or seat 32 comprising a back rest 33 and seat portion 34 supported on suitable legs 35 and covered with a decorative fabric 36. As shown, the back rest 33 is formed of a precured fibrous glass section 37 surrounded by an initially uncured fiber glass area 38, while the seat portion 34 comprises a core of precured fibrous glass 39 completely about which is disposed an initially uncured area 40. Such a structure provides an over-all chair having improved resiliency and compressibility, and has the advantage of being capable of being molded into a preformed body which will withstand repeated deflections without substantial deterioration of the fibers. Heretofore, this was not possible with glass fibers even when their surfaces were precoated with an oily material during the forming operation.

In FIG. 4 one of the many additional uses for the present invention is shown. This concerns the employment of the combination of the two types of fibrous materials as a cushioning medium against head impacts with a boxing or other sporting event platform. Injuries to the head, as for example skull fractures, have been numerous when a boxer is knocked down and strikes his head on materials such as hair felt pads. This condition may be avoided by covering the platform 41 with a structural unit or cushioning base 42 formed of a central area 43 of precured fibrous glass between adjacent layers 44 and 45 of initially uncured fibrous glass which have been compressed and cured into relatively denser layers. The principle of the fibrous combination as used on a boxing platform and the like is much the same as with crash pads, that is, maximum energy absorption with minimum rebound is provided. There, as with the crash pad, the precured area 43 is relatively less dense and of lesser resistance to deformation than the initially uncured layers 44 and 45.

The density ranges in platforms or other structural laminates such as the base 42 will, of course, vary depending upon the end use of the laminated structural unit, and such a laminate may have both surfaces comprising high density fibrous layers or only one surface may be formed of such a layer. Suitable structural units of this type have been manufactured with a core or base density ranigng from ½ to 2 pounds per cubic foot and with one or both facing surfaces being formed of fibrous layers having densities between about 2 to 10 pounds per cubic foot. If a core of ½ pound density material were used, a surface layer having a two pound density would be employed therewith whereas if a 2 pound density core were used a surface layer of about 10 pounds density would be used. In some instances of course it may be desirable to use a ½ pound core or base with a 10 pound skin. In each case, however, the ratio of core density to surface density would be between 1 to 4 and 1 to 20. This is a somewhat more narrow range than that which has been found satisfactory for crash pads wherein the ratio ranges from about 1 to 6 to 1 to 60.

The resin content for structural units of the type disclosed in FIG. 4, as was the case with crash pads, ranges from about 5 to 35% with satisfactory members being produced wherein both the core and surface layers have resin contents in the order of about 15%.

It was previously mentioned that a cure time of about thirty minutes at about 325° F. was ample to cure the high density layer and laminate the same to the core or base layer thus forming the substantially integral structural unit of the present invention. Suitable pressures to accomplish this laminating may range from about 2 to 15 pounds per square inch. Such pressures when used with the uncured fibrous layer compressed to within the density ranges previously brought out causes a flow of the fibers and uncured resin from the uncured layer into the voids between the fibers of the cured layer thus causing fibers of the uncured layer to extend between and become bonded to fibers in the cured layer as well as to the fibers in the initially uncured layer to form an interlocking bond between the layers. As previously brought out, this produces a high strength joint or interface connection between the two layers which has been found to be superior.

A combination of fibrous materials initially of varying degrees of cure may also be used to shape insulation parts, and to accomplish this the precured portion may be encased in a rigid initially uncured layer and molded to conform to the shape of an article such as a home refrigerator door. A suitable decorative layer need then only be suitably attached to the rigid outer layer, such as by gluing as with the decorative layers 18 and 19 on the crash pad A, and a structure results having rigidity sufficient to withstand considerable abuse and at the same time possessive of adequate thermal insulating properties.

In addition to gluing a decorative outer layer, such as a vinyl sheet, to the outer surfaces of the laminates produced in accordance with this invention to provide a decorative effect, other methods may be used. Thus plastisols and elastomers may be spray coated on the surface to provide a decorative outer layer. Such layers are of additional value in that they protect the rigid outer laminate layer from abrasive action.

It is to be understood that the foregoing detailed description is given merely by way of illustration and that many variations may be made therein without departing from the spirit of the invention and the scope of the appended claims.

We claim:

1. An article of manufacture having impact absorbing properties comprising the combination of a first and second mass of glass fibers, the fibers in each mass being haphazardly arranged and interbonded with a heat-cured resin, said first mass being relatively resilient and completely enclosed within said second mass, said first mass being under compression and functioning as a spring member, said second mass being less resilient and of substantially greater density than said first mass.

2. A fibrous laminate comprising a first resilient layer of individual glass fibers bonded by cured resin, one to another, and having voids therebetween and an adjacent layer of greater density and rigidity integrally joined therewith formed of individual discontinuous glass fibers bonded by cured resin, one to another, at their intersections and having voids therebetween, a portion of said fibers of said last mentioned layer extending into the voids of said first layer and being intermingled with and bonded to the fibers of said first layer, the density ratio of the first to the second layer being between about 1:4 and about 1:60.

3. A fibrous laminate as defined in claim 1 wherein the density of said first layer is between about one-half and three pounds per cubic foot and the density of said second layer is between about two and about thirty pounds per cubic foot.

4. A fibrous laminate as defined in claim 3 wherein said first layer has a density of between about one-half and about two pounds per cubic foot and said second layer has a density of between about two and about ten pounds per cubic foot.

5. A fibrous laminate as defined in claim 2 wherein said resins are present in an amount between about five and about thirty-five percent by weight.

6. A fibrous laminate having impact absorption properties comprising a laminate of a first and second mass of discontinuous glass fibers, the fibers of each mass being haphazardly arranged and bonded at their intersections by a heat cured resin, said second mass being less resilient and of substantially greater density than said first mass, said first mass being enclosed by said second mass and of less resistance to deformation than said second mass whereby impact to said laminate is principally absorbed by said first mass.

7. A fibrous laminate as defined in claim 6 wherein said first mass has a density between one-half and three pounds per cubic foot, said second mass has a density between about three and about thirty pounds per cubic foot and the ratio of density of said first mass to said second mass is between 1:4 and 1:60.

8. A method of forming a glass fiber laminate having adjacent layers of different densities comprising, placing in contact with a first fibrous layer of bonded individual glass fibers having voids therebetween a fibrous mass forming a second fibrous layer of individual glass fibers bonded by uncured thermosetting resin binder and having voids therebetween, and applying heat and pressure to said layers while in contact to compress said second layer to a density higher than the original density of said second layer and different than the density of said first layer, to bond said second fibrous layer to said first fibrous layer and to bond said fibers of said second layer one to another.

9. A method as defined in claim 8 wherein said second fibrous layer has an initial density lower than the density of said first fibrous layer and is compressed to and set at a density higher than the density of said first fibrous layer.

10. A method as defined in claim 8 wherein said second fibrous layer has an original density higher than said first fibrous layer and is compressed to a still higher density.

11. A method of forming a fibrous laminate as defined in claim 8 wherein the fibers of the first layer are bonded by a resin binder and the binder content of said fibrous layers is between about five and about thirty-five percent by weight and the fibers of each layer have an average diameter of less than about five microns.

12. A method of forming a fibrous laminate as defined in claim 8 wherein the pressure applied to the laminate is between about two and about fifteen pounds per square inch.

13. A method of forming a glass fiber laminate comprising, bringing into intimate contact, one with another, a plurality of layers of glass fibers including a first resilient layer of individual discontinuous glass fibers bonded one to another and having voids therebetween, and an adjacent second layer of individual discontinuous glass fibers containing unactivated binder, compressing said laminate to cause portions of the binder and fibers of said second layer to project into the voids between the fibers of said first layer and into intermingling contact with the fibers of said first layer, and activating said binder in said second layer while maintaining said layers in intimate contact to bond the fibers in said second layer one to another, to bond the fibers of said second layer projecting into said first layer to fibers in said first layer, and to set said second layer in a density different from the density of said first layer.

14. A method of forming a unitary resilient glass fiber laminate having layers of different densities, said laminate being dimensionally stable and firmly bonded throughout by means of cured thermosetting resin, comprising positioning in superimposed relationship two layers of individual discontinuous glass fibers, the individual fibers of one layer being bonded together at their intersections by means of cured thermosetting resin and the other layer having uncured thermosetting resin binder uniformly dispersed throughout, and curing said layers while in superimposed relationship with heat and pressure to compress said second layer into a density different from its original density and from the density of said first layer while simultaneously curing the uncured thermosetting resin contained in the said second layer.

References Cited in the file of this patent
UNITED STATES PATENTS

| | | |
|---|---|---|
| 2,117,371 | Slayter | May 17, 1938 |
| 2,610,337 | McMillin et al. | Sept. 16, 1952 |
| 2,612,462 | Zettel | Sept. 30, 1952 |
| 2,742,951 | Marc | Apr. 24, 1956 |

UNITED STATES PATENT OFFICE
CERTIFICATE OF CORRECTION

Patent No. 3,141,811                                  July 21, 1964

Herbert A. Fox et al.

It is hereby certified that error appears in the above numbered patent requiring correction and that the said Letters Patent should read as corrected below.

Column 10, line 13, for the claim reference numeral "1" read -- 2 --.

Signed and sealed this 8th day of December 1964.

(SEAL)
Attest:

ERNEST W. SWIDER                                  EDWARD J. BRENNER
Attesting Officer                                       Commissioner of Patents